Figure 1:
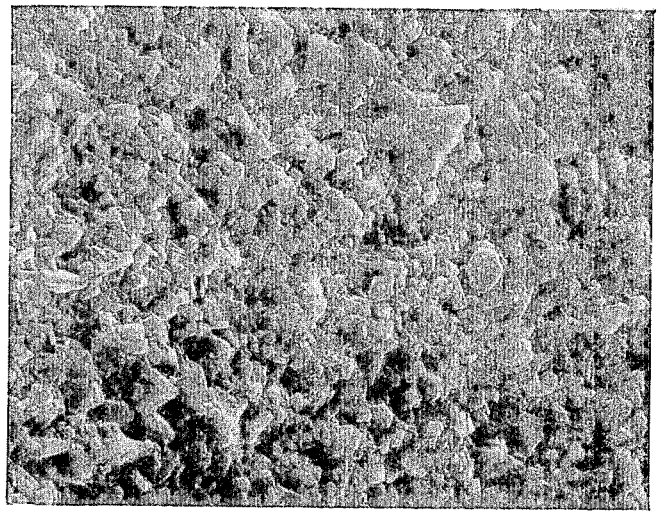

United States Patent [19]

Singh

[11] 4,381,216

[45] Apr. 26, 1983

[54] METHOD OF ETCHING TO FORM CATIONICALLY-CONDUCTIVE CERAMIC BODY

[75] Inventor: Raj N. Singh, Schenectady, N.Y.

[73] Assignee: General Electric Company, Schenectady, N.Y.

[21] Appl. No.: 289,579

[22] Filed: Aug. 3, 1981

[51] Int. Cl.$^3$ .............................................. C23F 1/00
[52] U.S. Cl. .................................. 156/667; 156/663; 252/79.2; 429/193
[58] Field of Search .............. 156/636, 663, 665, 667, 156/903; 252/79.2; 134/3; 429/193

[56] References Cited

U.S. PATENT DOCUMENTS 3,964,942 6/1976 Berkenblit et al. ............. 156/667 X
4,141,781 2/1979 Greskovich et al. ........... 156/667 X

FOREIGN PATENT DOCUMENTS 49-40843 11/1974 Japan ................................... 156/667

OTHER PUBLICATIONS

Mat. Res. Bull., vol. 5, No. 3, pp. 167–171, 1970, Pergamon Press, Inc., printed in the U.S., The Chemical Polishing of Magnesium Aluminate Spinel in Pyrophosphoric Acid, R. Aeschlimann et al.

Primary Examiner—William A. Powell
Attorney, Agent, or Firm—Jane M. Binkowski; James C. Davis, Jr.; James Magee, Jr.

[57] ABSTRACT

A cationically-conductive polycrystalline body having a specific resistivity at its surface portion higher than its specific intrinsic resistivity is contacted with phosphoric acid to produce an etched body having a uniform specific intrinsic resistivity.

8 Claims, 3 Drawing Figures

METHOD OF ETCHING TO FORM CATIONICALLY-CONDUCTIVE CERAMIC BODY

The present invention relates to a cationically-conductive polycrystalline ceramic of alkali metal beta- and/or alkali metal beta"-alumina composition useful as an electrolyte in a sodium-sulfur battery. In one particular aspect, it relates to chemical etching of the ceramic body to decrease the specific resistivity at its surface portion to that of its specific intrinsic (bulk) resistivity. In another particular aspect, it relates to the etched ceramic body of uniform specific resistivity.

A sodium-sulfur battery utilizes a ceramic separator material based on either sodium-beta- and/or sodium-beta"-alumina phases. The ceramic separator also performs as an electrolyte which preferentially allows only sodium ion migration during the operation of the battery. Specifically, the sodium-sulfur battery operates at about 330° C., and both sodium and sulfur are molten at the battery operating temperature. The separator between the sodium and the sulfur electrodes is a solid ionic membrane, usually just called beta-alumina (a chemical compound of $Na_2O$ and $Al_2O_3$, often with dopants such as $Li_2O$ and/or MgO). This solid ceramic membrane allows only $Na^+$-ion transport.

As in any other battery, the basic building block is a cell. Presently, the sodium-sulfur cell is cylindrical in geometry, and employs a closed-end sodium beta-alumina ceramic tube. In most designs, the inside of the tube is filled with sodium. Since sulfur is a poor conductor of electricity, a porous carbon matrix is used as the current collector. The beta-alumina ceramic tube is sealed onto a donut-shaped ceramic insulating disc to create a complete physical-chemical separation between the sodium and sulfur electrodes. The sodium and the sulfur containers serve as current collectors. In a battery, many sodium-sulfur cells are connected electrically in series/parallel.

Although these ceramic sodium beta- and/or beta"-alumina electrolytes have exhibited good or superior cell life, they also have suffered from higher resistivity values and resistance aging (increase in the electrolyte resistivity with usage in the Na/S cell).

An investigation of this phenomenon shows that the cell resistance in the radial direction of the ceramic electrolyte tube is invariably higher than the value estimated from intrinsic (bulk) resistivity data for that material. This suggests that there may be a surface film of higher resistivity value which produces higher in-cell resistivity values (in the radial direction) for these ceramic compositions. For example, a resistive surface film might be formed because of excessive amount of soda ($Na_2O$) in the material, i.e. an amount beyond the solubility limit for the beta- and/or beta"-alumina phase, and therefore will result in the precipitation of excess soda on the surface and grain boundaries of the sintered material. Since the soda-rich phases are more resistive than the phase-pure sodium beta- and/or sodium beta"-alumina ceramic material, they will cause the ceramic electrolyte to show additional resistivity in a Na/S cell due to the resistive surface film. Therefore, it is hypothesized that the removal of this surface film should result in lower Na/S resistance. This further suggests that in the absence of such a resistive film on the surfaces of the ceramic electrolyte, the phenomenon of resistance aging could also be minimized or eliminated.

The present invention is directed to the removal of surface film from the ceramic body by chemical etching to produce an etched body having a uniform specific resistivity.

Figure 2:
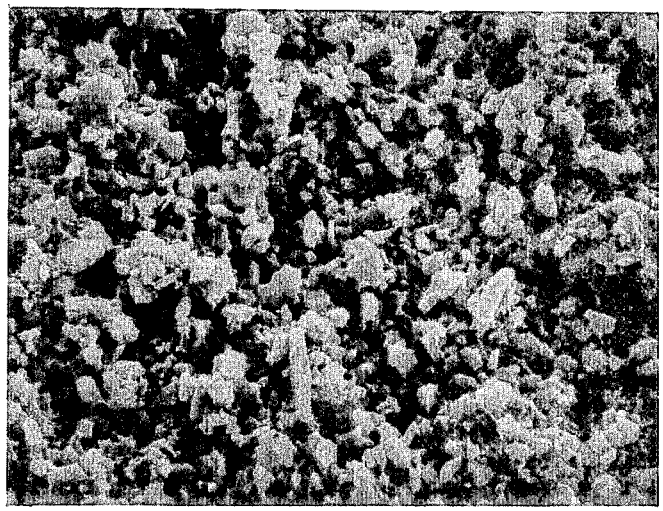
Figure 3:
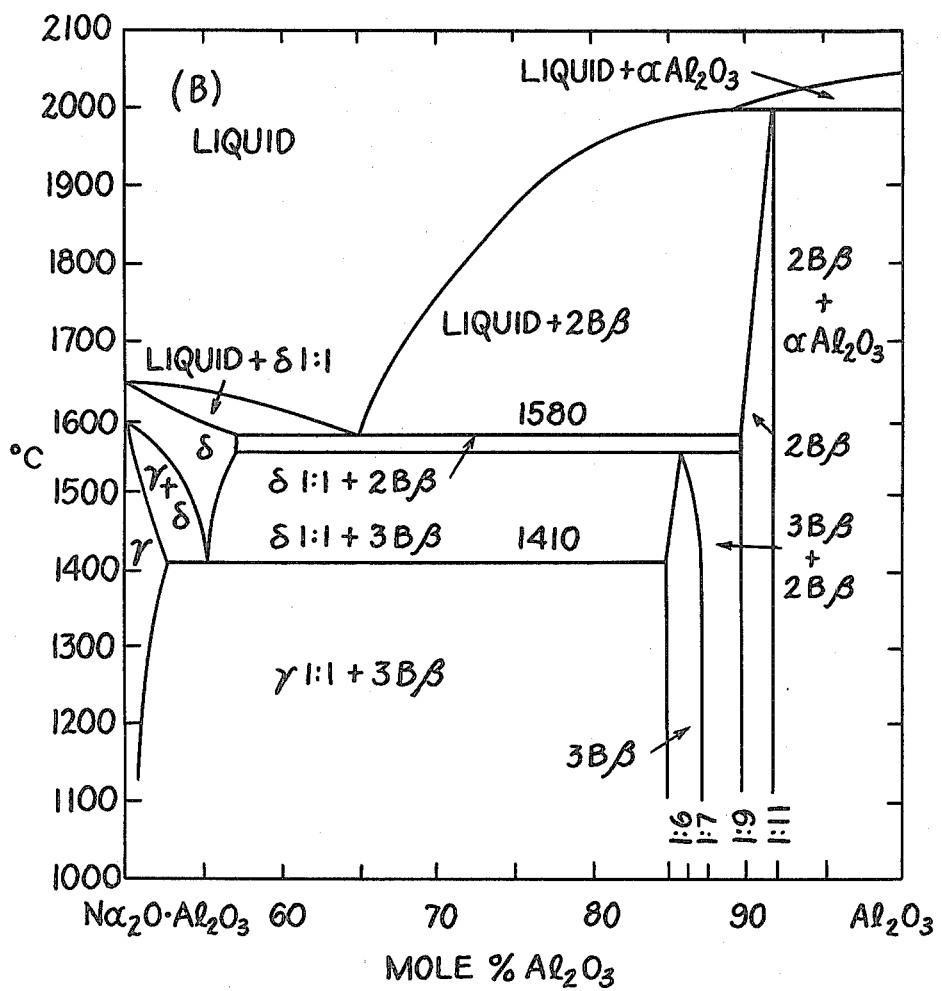

Those skilled in the art will gain a further and better understanding of the present invention from the detailed description set forth below, considered in conjunction with the figures accompanying and forming a part of the specification, in which:

FIG. 1 is a scanning electron micrograph (magnified 1000×) of an as-sintered sodium beta-alumina polycrystalline ceramic body;

FIG. 2 is a scanning electron micrograph (magnified 1000×) of the as-sintered body of FIG. 1 after it was etched according to the present invention; and FIG. 3 is a phase diagram of the system $Na_2O \cdot Al_2O_3$ which is shown on page 367 of "Evaluation of the Literature Data on $\beta$-$Al_2O_3$ and Related Phases," R. C. DeVries and W. L. Roth, Journal of American Ceramic Society, Vol. 52, No. 7, pages 364–369, wherein 2B $\beta$ denotes sodium beta-alumina phase and 3B $\beta$ denotes sodium beta"-alumina phase.

Briefly stated, the present method comprises providing a cationically-conductive polycrystalline ceramic body having a specific resistivity at its surface portion significantly higher than its specific intrinsic (bulk) resistivity, said ceramic body ranging in composition from an alkali metal beta-alumina phase to an alkali metal beta"-alumina phase including all combinations of said alkali metal beta-alumina phase and said alkali metal beta"-alumina phase, said alkali metal being selected from the group consisting of sodium, potassium, lithium, mixtures thereof, and alloys thereof, and etching the surface portion of said ceramic body with phosphoric acid to produce a cationically-conductive ceramic body having a specific resistivity at its etched surface portion at least not significantly different from its specific intrinsic resistivity, said phosphoric acid having a concentration of $P_2O_5$ which etches said ceramic body, said etching having no significant deleterious effect on said ceramic body.

The cationically-conductive polycrystalline ceramic body to be etched in the present process is composed of alkali metal beta-alumina phase, or alkali metal beta"-alumina phase, or any combination of the alkali metal beta-alumina and alkali metal beta"-alumina phases. This ceramic body covers a wide range of non-stoichiometric as well as stoichiometric compounds of alkali metal oxide and alumina and can be represented by the formula $A_2O \cdot xAl_2O_3$ where A is the alkali metal and x can vary from about 5 to about 11. The alkali metal is selected from the group consisting of sodium, potassium, lithium, mixtures thereof, and alloys thereof. The composition of the ceramic body can be determined by a number of techniques such as, for example, X-ray diffraction analysis and X-ray fluorescence analysis.

When required, the present ceramic body contains a stabilizer for the beta"-alumina phase. This stabilizer is selected from the group consisting of $Li_2O$, MgO, NiO, CoO and mixtures thereof. It is used in a stabilizing amount which usually ranges up to about 5% by weight of the ceramic body.

The alkali metal beta-alumina phase herein denotes that crystal structure in which the unit cell contains two spinel-like blocks, each with four layers of oxygen atoms, counting along the c-direction, with aluminum atoms in certain interstitial positions. The unit cell has a crystallographic repeat distance along the c-axis of approximately 22 Å. Monovalent cations are mobile in the rather loosely packed planes separating the individual spinel blocks. On the other hand, the alkali metal beta''-alumina phase denotes herein that the unit cell contains three spinel-like blocks and the crystallographic repeat distance is about 33 Å along the c-axis. In the alkali metal beta-alumina phase each spinel-like block is rotated 180° with respect to an adjacent one while in the alkali metal beta''-alumina phase, the rotation is 120°. In other words, the loosely packed conducting plane is also a mirror plane in the alkali metal beta-alumina phase but not in the alkali metal beta''-alumina phase.

The polycrystalline ceramic body to be etched can be prepared by a number of techniques. For example, a green body can be shaped in a conventional manner from the alkali metal beta-alumina powder or a mixture of reactants, for example a mixture of sodium oxide, lithium oxide, magnesium oxide and alumina which will produce the present alkali metal beta- and/or alkali metal beta''-alumina. The green body can be produced in a conventional manner such as isostatic pressing and slip casting. It can be in any desired shape and size, and it can be of a geometrically complex and/or hollow form. Preferably, it is in the form of a hollow tube closed at one end which, when fired, will be suitable for use in a sodium-sulfur battery. Such a hollow tube can be prepared by a conventional ceramic processing technique, or by electrophoretic deposition as disclosed in U.S. Pat. No. 3,900,381 to R. W. Powers incorporated herein by reference and assigned to the assignee hereof. The green body or hollow tube preferably has a density of at least about 40%, and preferably at least 50%, of the theoretical density for beta-$Al_2O_3$, i.e. 3.26 g/cc, to promote shrinkage to high density. The green body is sintered in an atmosphere which has no significant deleterious effect on it at sintering temperatures which may range from about 1525° C. to about 1825° C. For use as an electrolyte in a sodium-sulfur cell or battery, the sintered ceramic body has a density greater than 98%, and preferably greater than 99%, of the theoretical density for beta-$Al_2O_3$, i.e. 3.26 g/cc. Copending Ser. No. 180,600, entitled "Production of Beta-Alumina Ceramic Tubes" filed on Aug. 25, 1980 in the name of Robert W. Powers et al incorporated herein by reference and assigned to the assignee hereof, discloses the production of sintered sodium beta-, beta''-alumina cylindrical tubes of uniform shape suitable for use as an electrolyte in a sodium-sulfur battery which are useful in the present process.

The ceramic body to be etched has an electrical resistivity, i.e. a specific resistivity, at its surface or surface portion which is significantly higher than its specific intrinsic or bulk resistivity. Specific resistivity is a property of the material itself and resistance depends on the size of the sample as shown by the following formula $$R = \rho \frac{L}{A}$$

where R is the resistance in ohms of the ceramic body, L is its length, A is its cross sectional area and $\rho$ is its specific resistivity (ohm-cm).

As used herein specific resistivity is the resistance in ohms of the ceramic body one centimeter long and one square centimeter in cross-section. The smaller the intrinsic resistivity of the ceramic body, the better it is as a conductor.

The phosphoric acid used in the present process is a viscous liquid. It is comprised of water and $P_2O_5$, i.e. it is the reaction product of $P_2O_5$ and water, and it has a concentration of $P_2O_5$ which etches the ceramic body. Specifically, the present phosphoric acid can range in concentration of $P_2O_5$ from about 60% by weight to about 70% by weight of the total weight of the acid. A phosphoric acid having a concentration of $P_2O_5$ lower than about 60% by weight may not etch the ceramic body, or may etch it at a rate too slow to be practical. At atmospheric pressure, phosphoric acid begins to boil at a temperature ranging from about 120° C. to about 160° C., depending on its specific concentration. Since the acid vaporizes and increases in concentration as it boils, its boiling point increases continuously. Therefore, the rate of etching of the ceramic body increases substantially when the present etching phosphoric acid is kept boiling. A phosphoric acid with a $P_2O_5$ concentration approaching or about 70% by weight may also polish the surface producing a ceramic body with a polished surface portion as well as an etched surface portion. Polishing also removes the resistive surface film from the ceramic body to give the polished surface portion a specific resistivity which is not significantly different from that of its specific bulk or intrinsic resistivity and the resulting polished/etched cationically-conductive ceramic body constitutes another embodiment of the present invention.

A phosphoric acid having a concentration of $H_3PO_4$ of about 85 weight percent is approximately equal to a phosphoric acid having a $P_2O_5$ concentration of about 60 weight %. Since commercially available phosphoric acid does not have the required concentration of $P_2O_5$, it can be boiled to attain the desired concentration. The specific $P_2O_5$ concentration of the acid is determinable by measuring specific gravity. Alternatively, a highly concentrated phosphoric acid can be purchased and admixed with a less concentrated phosphoric acid to produce the present phosphoric acid.

In the present process, the ceramic body is contacted with the phosphoric acid and its surface or surface portion etched to remove the resistive film thereon to decrease the specific resistivity at its surface portion to a value which is the same as or at least not significantly different from its specific intrinsic resistivity. The extent of such etching is determinable empirically, and usually, it is completed by the etching away, i.e. removal, of about 3 microns to about 5 microns of the surface of the ceramic body. Acid contact time and temperature of treatment should be controlled so as not to over-etch the ceramic body thereby causing the generation of surface flaws/crack nucleation sites which will lead to premature failure of the ceramic body or electrolyte. Specifically, in carrying out the present etching, acid concentration, contact time and temperature are interrelated factors with the rate of etching ordinarily increasing with increasing acid concentration and increasing temperature. Any etching temperature can be used at which the rate of etching is practical and desirable, and generally etching temperature ranges from about room temperature to a temperature below 250° C. Preferably, for better control of the etching rate, the present etching is carried out at a temperature ranging from about 100° C. to about 200° C. At room temperature, etching of the ceramic body can be completed in a contact time of about 30 minutes. On the other hand, etching by contacting the ceramic body with the present phosphoric acid at about 150° C. can be completed in a contact time of from about 2 minutes to about 10 minutes. To prevent thermal shock, the ceramic body should be preheated to a temperature substantially the same as that of the etching phosphoric acid, and usually, such preheated ceramic is within ±25° C. of the temperature of the etching phosphoric acid.

The ceramic body can be contacted with the phosphoric acid by a number of techniques and etched in a batch-wise or continuous manner, as desired. Preferably, the ceramic body is immersed in the phosphoric acid. When the acid contact period is completed, i.e. when the desired etching has been attained, the phosphoric acid is removed from the etched body to arrest the acid attack, and preferably, such removal is carried out by rinsing the etched ceramic body with an alcohol such as methanol.

The present etching is carried out so that it has no significant deleterious effect on the resulting etched body.

The present etched cationically-conductive polycrystalline ceramic body has an etched surface, i.e. its surface or surface portion is acid-etched, or it has an etched and polished surface, i.e. part of its surface or surface portion is acid-etched and part of it is acid-polished. The present etched ceramic body has a specific resistivity at its surface portion which is at least not significantly different from its specific intrinsic (bulk) resistivity, and it ranges in composition from an alkali metal beta-alumina phase to an alkali metal beta''-alumina phase including all combinations of the alkali metal beta-alumina phase and the alkali metal beta''-alumina phase, said alkali metal being selected from the group consisting of sodium, potassium, lithium, mixtures thereof and alloys thereof.

The present etched ceramic body is useful for a wide variety of applications. It is useful as an electrolyte in devices such as sodium-sulfur batteries and electrochromic displays. It is particularly useful as an electrolyte, usually in the form of a hollow tube closed at one end, in a sodium-sulfur cell or battery or a similar type of cell or battery. Ordinarily, when used as an electrolyte, it has a density higher than about 98%, and preferably higher than about 99%, of the theoretical density for beta-alumina, i.e. 3.26 g/cc.

A number of techniques can be used to determine the specific intrinsic resistivity of the ceramic body such as, for example, the four probe technique and complex impedance analysis. The four probe technique is comprised of four electric terminals inserted within the sample. Two of the terminals are used for passing current within the sample only, and the other two terminals are used for measuring the generated potential difference. In this technique, since the current passes only within the sample, the potential difference generated is that from the bulk of the sample, or predominantly that of the bulk of the sample, and not that of the surface. Knowing the potential difference and the current for the sample, its resistance can be determined, i.e. resistance=potential difference/current, and from the resistance and size of the sample, its specific resistivity can be determined.

Complex impedance analysis is a standard method in the art which measures resistance as a function of frequency over a wide range of frequencies, and from these plots, the specific bulk or intrinsic resistivity can be determined.

This invention is further illustrated by the following examples wherein the procedure and materials were as follows unless otherwise noted:

The phase composition of the sintered polycrystalline ceramic tube was determined by X-ray diffraction analysis.

Density was determined in a standard manner.

Charge and discharge resistances were measured in a standard manner using a half cell comprised of $NaNO_3$/electrolyte/Na, where liquid sodium and liquid sodium nitrate at 350° C. are used as electrodes on the inside, and outside of the electrolyte tube, respectively.

EXAMPLE 1

A sintered polycrystalline ceramic hollow tube closed at one end and open at the opposite end with an inner diameter of about 1.0 cm, a wall thickness of about 0.1 cm and a length of about 7 cm was used as an electrolyte. Almost 100% by volume of the sintered tube was sodium beta-alumina phase. The chemical composition of the sintered tube was 9.6% by weight $Na_2O$, 0.25% by weight $Li_2O$ and the balance was $Al_2O_3$. The tube had a density greater than about 99% of the theoretical density for beta-alumina and had been prepared in a known manner, i.e. the powder composition was formed into the shape of a green tube and fired at about 1575° C. in an atmosphere which had no significant deleterious effect on it. The microstructure of the surface of this assintered tube is shown in FIG. 1.

85% concentrated ($P_2O_5$ concentration of about 60% by weight) phosphoric acid was heated at atmospheric pressure and when it started boiling, i.e. at about 150° C., the ceramic tube, which had been preheated to about 150° C. to prevent thermal shock, was immersed into the boiling phosphoric acid. The ceramic tube was kept immersed in the boiling phosphoric acid for three minutes, and during this three-minute period, the temperature of the acid was continuously raised to about 160° C. to keep the acid boiling. The boiling etching phosphoric acid was a viscous liquid, and from data obtained in other similar experiments, it was estimated that the $P_2O_5$ concentration of the acid increased during boiling to about 65% by weight.

The ceramic tube was then removed from the boiling phosphoric acid, cooled to room temperature, and washed for one hour at room temperature with methanol to remove the acid. After this, the ceramic tube was vacuum annealed to 1000° C. for two hours to remove the left-over methanol and adsorbed water vapors. The entire surface of the ceramic tube appeared etched, i.e. the surface within the tube as well as its outer surface. FIG. 2 shows the microstructure of the etched surface which appears to be more distinctive than that of FIG. 1.

The tube appeared not to have been changed significantly in size by the etching, and the etching appeared not to have had any significant deleterious effect on it.

It was believed that the three-minute immersion in the boiling phosphoric acid had etched the tube sufficiently to remove the resistive surface film from its surface as well as the grain boundary areas near the surface. To test this, the etched tube was assembled in a half-cell in a usual manner, and the etched ceramic tube was electrolytically filled with liquid sodium from an $NaNO_3$ bath at 350° C. The radial resistance of the half-cell was measured utilizing an $NaNO_3$ bath on the outside surface of the etched ceramic tube and liquid sodium on its inside surface. The following results were obtained:

| Tube No. | Temperature (°C.) | Radial Resistance(Ω) | |
|---|---|---|---|
| | | Charge ($R_c$) | Discharge ($R_d$) |
| GW2-4 | 355 | 0.11 | 0.11 |

The cell-resistance value of 0.11 ohm was significantly lower than the value of 0.165 ohm which normally had been obtained for similar tubes without this acid treatment, i.e. for as-sintered tubes of the same size which did not differ significantly in composition or density from the etched ceramic tube herein. This is approximately a 33% decrease in the half-cell resistance.

The cell-resistance value of 0.11 ohm corresponds to a resistivity value of 11.12 ohm-cm at 350° C. for this polycrystalline ceramic tube composition. This value is not significantly different from the bulk resistivity value of about 12 ohm-cm at 350° C. for this ceramic material measured by the 4-probe technique.

This example illustrates the achievement of bulk resistivity for the ceramic tube in the radial direction in accordance with the present invention, i.e. the lowering of the specific resistivity at its surface portion so that it does not differ significantly from its specific intrinsic resistivity.

EXAMPLE 2

The procedure used in this example was substantially similar to that disclosed in Example 1 except that the sintered polycrystalline ceramic tube used as an electrolyte was different in composition and it was composed of about 65% by volume of sodium beta"-alumina phase and about 35% by volume of sodium beta-alumina phase, and its cell resistance was measured before and after it was etched.

The as-sintered (unetched) tube was assembled as a half cell in the same manner disclosed in Example 1 and its radial resistance was determined to be 0.08 ohm at 350° C.

The tube was then recovered from the cell and rinsed with methanol at room temperature to wash off the sodium.

85% phosphoric acid ($P_2O_5$ concentration of about 60% by weight) was heated to boiling, and at about 150° C., the present etched tube, also preheated to about 150° C., was immersed therein for about three minutes. During this three minute period, the temperature of the acid was continuously raised to about 160° C. to keep the acid boiling.

The resulting etched tube was cooled to room temperature and washed with methanol to remove the acid.

The tube appeared not to have changed in size significantly by the etching, and the etching appeared not to have had any deleterious effect on it.

The etched tube was then assembled as a half cell in the same manner as it had been when unetched, and its radial resistance was measured in the same manner. Its radial resistance at 350° C. was 0.05 ohm. This value corresponds to a specific resistivity value of 7.6 ohm-cm at 350° C. which does not differ significantly from the specific intrinsic resistivity value of 7.0 ohm-cm at 350° C. for this sintered polycrystalline ceramic material measured by the 4-probe technique.

EXAMPLE 3

The procedure used in this example was substantially the same as that set forth in Example 2 except that the sintered polycrystalline ceramic tube used as an electrolyte differed in composition and it was comprised of about 100% by volume of sodium beta"-alumina phase.

The as-sintered (unetched) tube was assembled as a half cell in the same manner set forth in Example 2 and its radial resistance was determined to be 0.07 ohm at 350° C.

The tube was then recovered from the cell and washed with methanol at room temperature to remove the sodium therefrom. It was then etched in the same manner disclosed in Example 2. After etching, it was cooled to room temperature and washed with methanol to remove the acid.

The tube appeared not to have been changed in size by the etching in any significant manner, and the etching appeared not to have had any deleterious effect on it.

The etched tube was then assembled as a half cell in the same manner as it had been when it was unetched, and its radial resistance was measured in the same manner. Its radial resistance at 350° C. was 0.05 ohm. This value corresponds to a specific resistivity value of 5.0 ohm-cm at 350° C. which does not differ significantly from the specific intrinsic resistivity of 4.8 ohm-cm at 350° C. for this sintered polycrystalline ceramic material measured by the 4-probe technique.

The following copending U.S. patent applications are assigned to the assignee hereof and are incorporated herein by reference:

Ser. No. 289,580 filed on even date herewith in the name of Raj Narain Singh entitled "ETCHED BETA"-ALUMINA CERAMIC ELECTROLYTE" discloses a cationically-conductive sodium beta"-alumina electrolyte showing asymmetric polarization which is contacted with phosphoric acid to produce an etched electrolyte showing no asymmetric polarization.

Ser. No. 289,578 filed on even date herewith in the name of Raj Narain Singh entitled "CHEMICALLY POLISHED CERAMIC BODY" discloses an alkali metal beta- and/or beta"-alumina polycrystalline body which is chemically polished by contacting it at a polishing temperature with phosphoric acid of polishing concentration.

What is claimed is:

1. A process for producing a cationically-conductive ceramic body having an etched surface and a specific resistivity at its surface portion which is at least not significantly different from its specific intrinsic resistivity which comprises providing a cationically-conductive ceramic body having a specific resistivity at its surface portion significantly higher than its specific intrinsic resistivity, said ceramic body ranging in composition from an alkali metal beta-alumina phase to an alkali metal beta"-alumina phase including all combinations of said alkali metal beta-alumina phase and said alkali metal beta"-alumina phase, said alkali metal being selected from the group consisting of sodium, potassium, lithium, mixtures thereof and alloys thereof, and etching the surface portion of said ceramic body with phosphoric acid to produce said cationically-conductive ceramic body with a specific resistivity at its surface portion which is at least not significantly different from its specific intrinsic resistivity, said phosphoric acid having a concentration of $P_2O_5$ which etches said ceramic body, said etching having no significant deleterious effect on said ceramic body.

2. The process according to claim 1 wherein said alkali metal is sodium.

3. The process according to claim 1 wherein said etching is carried out at a temperature ranging from about room temperature to a temperature below 250° C.

4. The process according to claim 1 wherein said ceramic body is also polished by said phosphoric acid producing a cationically-conductive ceramic body having an etched surface portion and a polished surface portion with the specific resistivity at its surface portions being at least not significantly different from its specific intrinsic resistivity.

5. The process according to claim 1 wherein said ceramic body is immersed in said phosphoric acid.

6. The process according to claim 1 wherein said ceramic body contains alkali metal beta"-alumina phase and contains a stabilizer for said alkali metal beta"-alumina phase.

7. The process according to claim 6 wherein said stabilizer is selected from the group consisting of $Li_2O$, MgO, NiO, CoO and mixtures thereof.

8. The process according to claim 1 wherein said ceramic body is in the form of a hollow tube closed at one end and useful as an electrolyte in a sodium-sulfur cell.

* * * * *